United States Patent [19]

Whitman

[11] Patent Number: 5,399,535
[45] Date of Patent: Mar. 21, 1995

[54] RETICULATED CERAMIC PRODUCTS

[75] Inventor: David W. Whitman, Sumneytown, Pa.

[73] Assignee: Rohm and Haas Company, Philadelphia, Pa.

[21] Appl. No.: 107,861

[22] Filed: Aug. 17, 1993

[51] Int. Cl.$^6$ .................................... C04B 38/00
[52] U.S. Cl. .................................... 501/80; 501/12; 423/335; 423/338; 502/439
[58] Field of Search .................... 501/12, 80, 85; 502/439; 423/338, 335

[56] References Cited

U.S. PATENT DOCUMENTS

| | | | |
|---|---|---|---|
| 4,010,242 | 3/1977 | Iler et al. | 423/335 |
| 4,218,430 | 8/1980 | Biggerstaff | 423/632 |
| 4,263,268 | 4/1981 | Knox et al. | 423/449 |
| 4,752,458 | 6/1988 | Robinson | 423/335 |
| 4,777,153 | 10/1988 | Sonuparlak et al. | 501/82 |
| 4,857,395 | 8/1989 | Benton et al. | 428/306.6 |
| 4,871,693 | 10/1989 | Inoue et al. | 501/9 |
| 4,911,903 | 3/1990 | Unger et al. | 423/335 |
| 4,923,578 | 5/1990 | Benton et al. | 204/130 |
| 4,970,035 | 11/1990 | Baarsch | 204/59 |
| 5,264,197 | 11/1993 | Wang et al. | 423/358 |

FOREIGN PATENT DOCUMENTS

| | | |
|---|---|---|
| 195353 | 9/1986 | European Pat. Off. . |
| 366252 | 5/1990 | European Pat. Off. . |
| 295283 | 12/1986 | Japan . |
| 30542 | 2/1988 | Japan . |
| 1153580 | 6/1989 | Japan . |
| 222184 | 1/1990 | Japan . |
| 2170189 | 7/1986 | United Kingdom . |

OTHER PUBLICATIONS

Card, et al., "Solid Ceramic Fibers via Impregnation of Activated Carbon Fibers," J. Am. Ceram. Soc., 73[3] pp. 665–668 (1990), publishedin in WHERE no month.

Primary Examiner—Mark L. Bell
Assistant Examiner—Paul Marcantoni
Attorney, Agent, or Firm—David T. Banchik

[57] ABSTRACT

A reticulated ceramic product is provided having from about 5 to about 95 percent, preferably from about 10 to about 90, percent of the total porosity attributable to mesopores. Reticulated ceramic products provided include silicon oxide, aluminum oxide, zirconium oxide and ruthenium oxide. Reticulated ceramic products are prepared using a porous solid matrix as a template. The reticulated ceramic products are useful as chromatographic media, catalysts and adsorbents.

16 Claims, 7 Drawing Sheets

RETICULATED CERAMIC PRODUCTS

The present invention is directed to reticulated ceramic products. In particular, the present invention is directed to reticulated ceramic products of controlled porosity and pore size distribution. The present invention is further directed to a process for preparing reticulated ceramic products.

The term "reticulated" relates to the network-like pore structure of the ceramic products of the present invention. The porosity of the ceramic products of the present invention is a result of micropores, mesopores and macropores. As defined by Gregg, et al., in *Adsorption, Surface Area and Porosity*, "micropores" are pores having diameters of less than about 20 angstroms (Å), "mesopores" are pores having diameters of from about 20Å to about 500Å, and "macropores" are pores having diameters of greater than about 500Å.

The porous ceramic materials previously known achieve their porosity predominantly from macropores, micropores or both. Several methods for introducing macroporosity into ceramic materials are known. One method involves incorporating volatile organic solvents or other combustible media throughout a sol of a ceramic precursor. The sol is then allowed to gel. The resulting gel is then heated to an elevated temperature sufficient to form the ceramic material and volatilize the entrained organic material. The voids remaining in the ceramic formed by the extant organic material are predominantly macropores. One common method for introducing micropores is precipitation of the ceramic material from solution.

Another method for attempting to prepare ceramic materials with porosity, as disclosed in U.K. Patent Application 2,170,189A involves the preparation of microspheres of ceramic materials by hydrolyzing an organic ceramic precursor in the presence of a protective colloid. The voids, or pores, remaining in the ceramic formed by this process are predominantly macropores.

It is desirable to have ceramic materials of increased microporosity and mesoporosity for use as chromatographic media, catalysts, adsorbents and electronic components.

It is also desirable in many of these applications to have ceramic materials with high surface area, preferably above 10 square meters per gram ($m^2/g$).

It is also desirable to have ceramic materials of increased mesoporosity and surface area which are generally spherical in shape.

Figure 1:
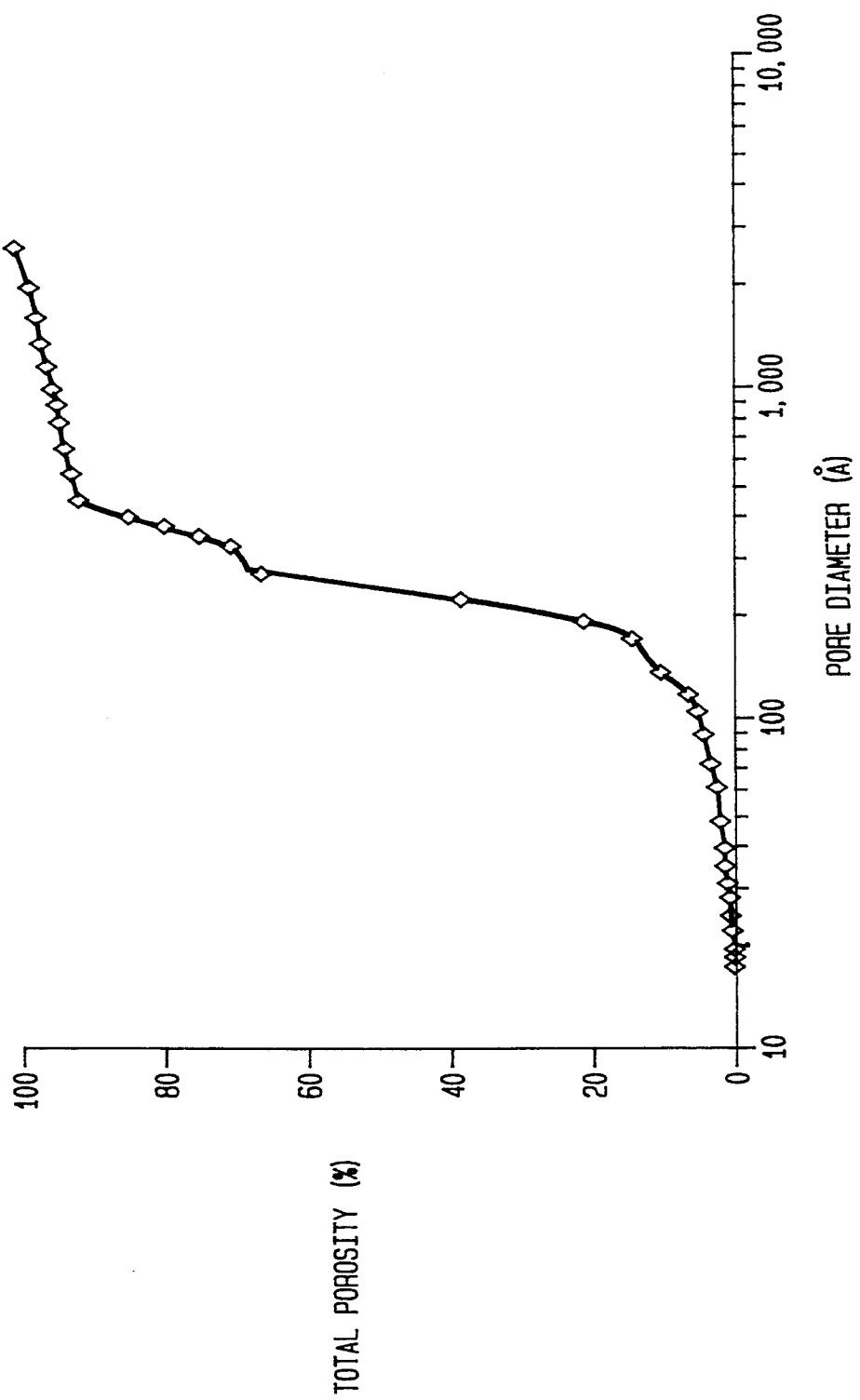
FIG. 1 is a plot of the cumulative percentage of the total porosity as a function of pore diameter for a sample prepared according to the present invention.

The present invention provides a reticulated ceramic product having a total pore volume comprising micropore volume, mesopore volume and macropore volume, wherein the micropore volume is from 0 to about 60 percent of the total pore volume, mesopore volume is from about 5 to about 95 percent of the total pore volume, macropore volume is from 0 to about 95 percent of the total pore volume, and wherein the sum of the micropore volume, the mesopore volume and the macropore volume is 100 percent of the total pore volume.

The present invention further provides a method of making reticulated ceramic products comprising: disposing one or more liquid ceramic precursors throughout a portion of a porous solid matrix, forming a gel from the one or more liquid ceramic precursors disposed throughout said portion of the porous solid matrix, forming a ceramic from the gel, and removing a portion of said porous solid matrix.

The reticulated ceramic products of the present invention preferably have from about 5 to about 95 percent of the total porosity attributable to mesopores, and more preferably from about 10 to about 90 percent of the total porosity attributable to mesopores, and most preferably from about 20 to about 85 percent of the total porosity attributable to mesopores. It is also preferred that these reticulated ceramic products of the present invention have a portion of the total porosity attributable to micropores, most preferably up to about 50 percent of the total porosity attributable to micropores. The reticulated ceramic products of the present invention preferably have a total surface area of at least about 10 $m^2/g$, more preferably from about 20 to about 500 $m^2/g$. The pore sizes, the pore size distribution and the total surface area of the reticulated ceramic products of the present invention will depend, in part, on the pore sizes and pore size distributions of the porous solid matrix from which the reticulated ceramic product is prepared. Other factors influencing the pore sizes, the pore size distribution and the total surface area of the reticulated ceramic products of the present invention include the extent to which the liquid ceramic precursor is disposed throughout the porous solid matrix, the extent to which the porous solid matrix is removed, and shrinkage of the ceramic precursor.

The overall shape of the reticulated ceramic product can also be controlled and will generally depend upon the overall shape of the porous solid matrix from which the reticulated ceramic product is prepared. The reticulated ceramic products of the present invention are preferably free-flowing spherical particles having diameters of from about 2 microns to about 10 millimeters, and most preferably from about 20 microns to about 5 millimeters. The reticulated ceramic products will generally have improved flow properties when the particles are spherical. Spherical particles also generally exhibit more ordered packing and have predictable pressure drop characteristics (based on their particle size) when gases or fluids are passed through a bed thereof.

The liquid ceramic precursors useful in the present invention are preferably metal salts or complexes which are capable of being converted into gels wherein the gels can be converted to their oxides, or converted to their nitrides, carbides or borides. Preferably, the ceramic precursors are metal salts or complexes which are themselves liquids; however ceramic precursors which are dissolved or suspended may also be used. Suitable metal salts include alkoxides, halides, carbonates, sulfates and carboxylates of metals such as titanium, tin, lead, zirconium, ruthenium, tungsten, yttrium, nickel, magnesium, calcium, .aluminum, silicon and boron. Suitable complexes include acetoacetonates, carbonyls, nitrosyls, and cyclopentadienyls of metals such as titanium, tin, lead, zirconium, nickel, magnesium, calcium, aluminum, silicon and boron. Preferred examples of the liquid ceramic precursors useful in the present invention include tetraethyl orthosilicate (TEOS), sodium silicate, zirconium tetrapropoxide, aluminum tri(sec-butoxide), ruthenium III 2,4-pentanedionate, and titanium tetrapropoxide.

The porous solid matrices useful in the present invention may be porous solid organic matrices or porous solid inorganic matrices which are capable of being at least partially removed from the reticulated ceramic product. Suitable inorganic porous solid matrices include, for example, porous $SiO_2$ and zeolites. Preferred porous solid matrices are porous solid organic matrices such as, for example, porous polymer particles, more preferably porous polymer spheres such as porous ion-exchange resins and adsorbents. Porous polymer spheres may be prepared, for example, by suspension polymerization, jetting or techniques well-known to those skilled in the art of polymer manufacture. Preferably, the porous polymer particles are crosslinked polymers or copolymers having permanent porosity although gellular polymer particles may also be used provided they are not soluble in the liquid ceramic precursor. In addition, it is preferred that the porous solid matrix is swelled by the liquid ceramic precursor. It is also preferred that the porous solid matrix have from about 5 to about 95 percent of the total porosity attributable to macropores. The presence of macropores may facilitate disposing the liquid ceramic precursor throughout the porous solid matrix and converting the liquid ceramic precursor to a gel. The porous solid matrix preferably has a width, or in the case of spherical particles a diameter, of from about 2 microns to about 10 millimeters, and most preferably from about 20 microns to about 5 millimeters. If the width, or diameter, of the porous solid matrix is too small, there is an increased likelihood that the final ceramic product will be agglomerated. If the width, or diameter, of the porous solid matrix is too large, it is difficult to dispose the liquid ceramic precursor throughout the matrix, and it is difficult to convert the liquid ceramic precursor to a gel.

The monomeric constituents of the porous polymer particles is not critical for the present invention. Suitable monomers for preparing the porous solid matrix include styrene, and derivatives thereof, acrylic and methacrylic acids and esters, and derivatives thereof, and crosslinking monomers such as divinylbenzene, and multifunctional acrylic and methacrylic monomers such as trimethylolpropanetriacrylate, trimethylolpropanetrimethacrylate, pentaerythritol triacrylate, tripropyleneglycol diacrylate and ethyleneglycol dimethacrylate. The porous polymer particles may lack functionality, or they may be partially or completely functionalized. For example, the porous polymer particles may contain free acid groups, free base groups, or salts thereof. In one embodiment of the present invention, the porous solid matrix contains one or more compounds which are, or which can be converted to, metals or metal oxides. Porous solid matrices containing such compounds can be prepared, for example, by disposing a solid, liquid or gas of such compounds throughout at least a portion of the matrix. Another means of preparing porous solid matrices containing such compounds is, for example, by using an ion-exchange resin as the porous solid matrix and preparing salts of the resin's functional groups with ions of compounds which are, or which can be converted to metals or metal oxides. By using a porous solid matrix containing compounds which are, or which can be converted to, metals or metal oxides, reticulated ceramic products can be prepared which contain metals or metal oxides on the surfaces of the pores of the reticulated ceramic product. FIG. 4 shows a schematic cross-sectional representation of a porous solid matrix containing metal compounds. This would allow for the efficient use of, for example, precious metals in the preparation of precious metal catalysts. Suitable compounds which are, or which can be converted to, metals or metal oxides, include transition metals such as, for example, nickel, platinum, palladium, and oxides thereof.

To prepare the reticulated ceramic products of the present invention, it is necessary to dispose the one or more liquid ceramic precursors throughout a portion of the porous solid matrix. The ceramic precursor, whether a liquid, solution or suspension, may be disposed throughout a portion of the porous solid matrix by contacting the liquid ceramic precursor with the porous solid matrix for a period of time sufficient for the liquid ceramic precursor to penetrate the porous solid matrix. Generally, it is preferred to contact the liquid ceramic precursor with the porous solid matrix for from about 1 minute to about 48 hours at room temperature. Temperatures slightly above room temperature may facilitate penetration of the liquid ceramic precursor in and through the porous solid matrix and thus shorten the amount of time needed. Preferably, the liquid ceramic precursor is contacted with the porous solid matrix at from about 10° C. to about 100° C. for from about 5 minutes to about 24 hours.

Figure 2A:
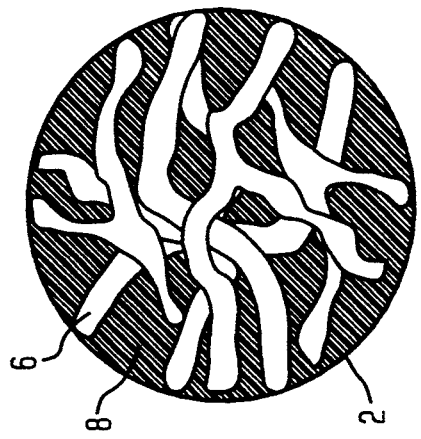
FIG. 2 is a cross-sectional schematic representation of: (a) a porous solid matrix; (b) a porous solid matrix throughout the entirety of which a liquid ceramic precursor has been disposed; (c) the porous solid matrix from (b) wherein the liquid ceramic precursor is in the form of a gel or ceramic; (d) a reticulated ceramic product formed by removing the porous solid matrix from (c).
Figure 2B:
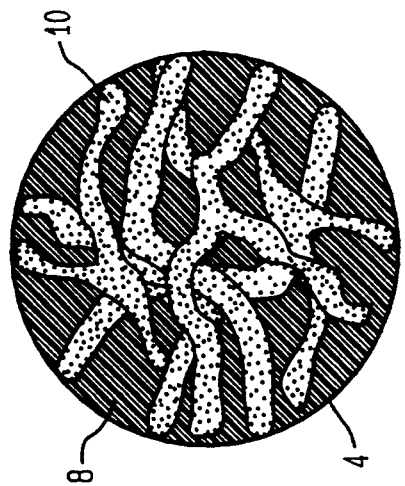
Figure 2D:
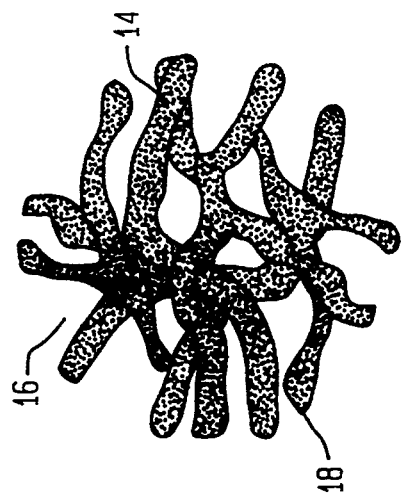
Figure 2C:
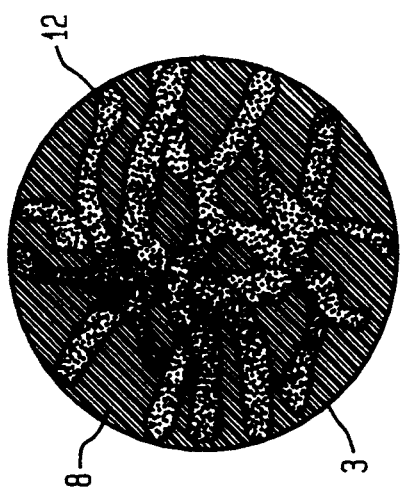

In one embodiment of the present invention, the liquid ceramic precursor is disposed substantially completely throughout the porous solid matrix. In this case, after the gel has been formed from the liquid ceramic precursor, the ceramic has been formed and the porous solid matrix has been removed, the resulting reticulated ceramic product approximates a spatial mirror image of the original porous solid matrix. That is, the reticulated ceramic product will have ceramic material in the general configuration of the pores and voids of the original matrix. In addition, the reticulated ceramic product will have pores and voids in the general configuration of the original matrix. FIG. 2a shows a cross-sectional schematic representation of a porous solid matrix having a solid component (8) and pores (6). FIG. 2b shows a cross-sectional schematic representation of a porous solid matrix having a solid component (8) and pores which are substantially completely filled with liquid ceramic precursor (10). FIG. 2c shows a cross-sectional schematic representation of a porous solid matrix having a solid component (8) and pores which are substantially completely filled with ceramic (12). FIG. 2d shows a cross-sectional schematic representation of a reticulated ceramic product having a solid ceramic component (14) and pores (16).

In order to dispose the liquid ceramic precursor substantially throughout the porous solid matrix, it is preferred to use a volume of liquid ceramic precursor which is approximately equal to, or in excess of, the total pore volume of the porous solid matrix. Liquid ceramic precursor which is disposed throughout the porous solid matrix may either be absorbed by the porous solid matrix and thereby swell the matrix, or simply occupy the pores themselves. Most preferably, the volume of liquid ceramic precursor approximates the sum of the total pore volume and the volume of liquid ceramic precursor absorbed by the porous solid matrix. If an excess of liquid ceramic precursor is used, it may be desirable to remove the excess from the sample before converting the liquid ceramic precursor to a gel in order to prevent agglomeration.

Figure 3B:
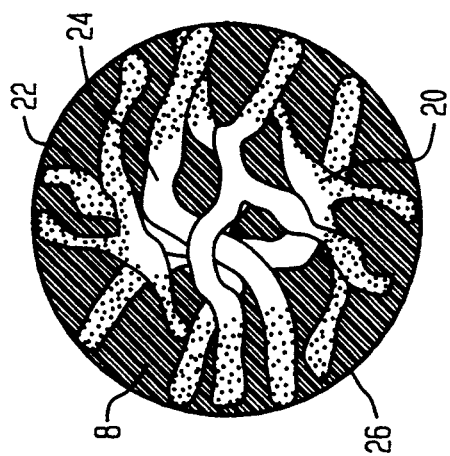
FIG. 3 is a cross-sectional schematic representation of: (a) a porous solid matrix; (b) a porous solid matrix throughout a portion of which a liquid ceramic precursor has been disposed; (c) the porous solid matrix from (b) wherein the liquid ceramic precursor is in the form of a gel or ceramic; (d) a reticulated ceramic product formed by removing the porous solid matrix from (c).
Figure 3A:
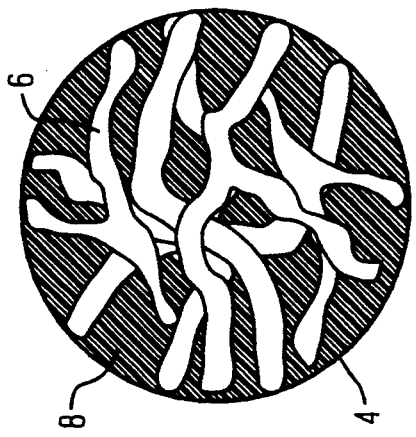
Figure 3D:
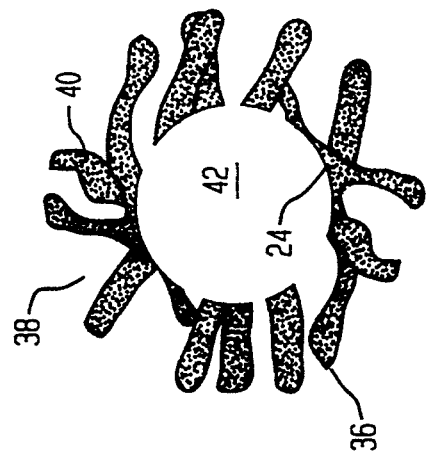
Figure 3C:
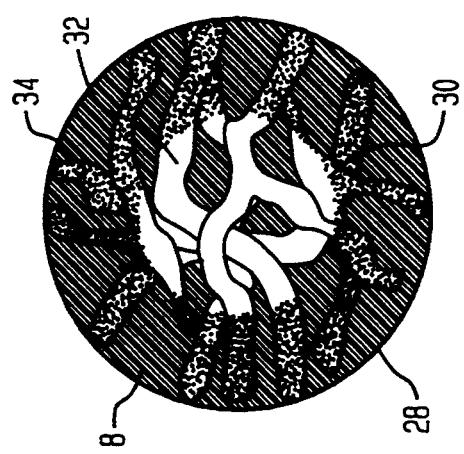

In another embodiment of the present invention, the liquid ceramic precursor is disposed partially throughout the porous solid matrix. For example, if the matrix is spherical, the liquid ceramic precursor may be disposed throughout a distal annular portion of the spherical matrix. In this case, after the gel is formed from the liquid ceramic precursor, the ceramic is formed and the porous solid matrix is removed, the resulting reticulated ceramic product approximates a hollow sphere wherein the sphere approximates a spatial mirror image of the distal annular portions of the original porous solid matrix. That is, the reticulated ceramic product will have ceramic material in the general configuration of the distal pores and voids of the original matrix. In addition, the reticulated ceramic product will have a single proximal, or central, void and pores and voids in the general configuration of the distal portions of the original matrix. FIG. 3a shows a cross-sectional schematic representation of a porous solid matrix having a solid component (8) and pores (6). FIG. 3b shows a cross-sectional schematic representation of a porous solid matrix having a solid component (8), pores in the distal annular portion of the porous solid matrix which are substantially completely filled with liquid ceramic precursor (22), and pores in the proximal or central portion of the porous solid matrix which do not have liquid ceramic precursor (24). FIG. 3c shows a cross-sectional schematic representation of a porous solid matrix having a solid component (8), pores in the distal annular portion of the porous solid matrix which are substantially completely filled with ceramic (34), and pores in the proximal or central portion of the porous solid matrix which do not have ceramic (32). FIG. 3d shows a cross-sectional schematic representation of a reticulated ceramic product having a solid ceramic component (40), pores (38) and a proximal or central void (42).

In order to dispose the liquid ceramic precursor partially throughout the porous solid matrix, it is preferred to use a volume of liquid ceramic precursor which is less than the sum of the total pore volume of the porous solid matrix and the volume of liquid ceramic precursor which may be absorbed by the porous solid matrix.

Figure 4B:
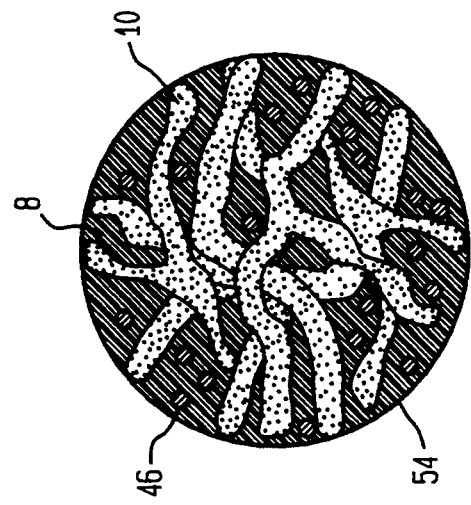
FIG. 4 is a cross-sectional schematic representation of: (a) a porous solid matrix containing metals or metal oxides; (b) a porous solid matrix throughout the entirety of which a liquid ceramic precursor has been disposed; (c) the porous solid matrix from (b) wherein the liquid ceramic precursor is in the form of a gel or ceramic; (d) a reticulated ceramic product formed by removing the porous solid matrix from (c).
Figure 4A:
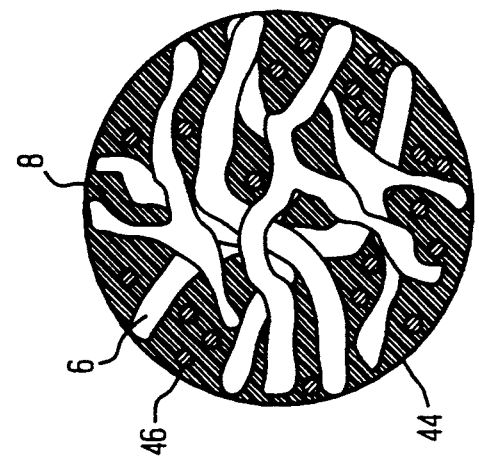
Figure 4D:
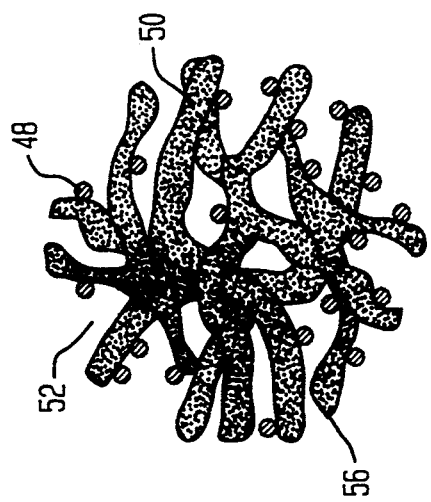
Figure 4C:
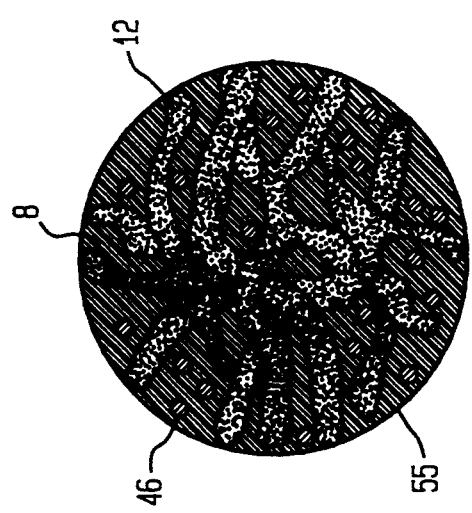

In another embodiment of the present invention, the porous solid matrix contains compounds which are, or which can be converted to metals or metal oxides. In this case, after the gel has been formed from the liquid ceramic precursor, the ceramic has been formed and the porous solid matrix has been removed, the resulting reticulated ceramic product contains metals or metal oxides on or near the surfaces of the pores of the reticulated ceramic product. FIG. 4a shows a cross-sectional schematic representation of a porous solid matrix having a solid component (8), compounds which are, or which can be converted to metals or metal oxides (46), and pores (6). FIG. 4b shows a cross-sectional schematic representation of a porous solid matrix having a solid component (8), compounds which are, or which can be converted to metals or metal oxides (46), and pores which are substantially completely filled with liquid ceramic precursor (10). FIG. 4c shows a cross-sectional schematic representation of a porous solid matrix having a solid component (8), compounds which are, or which can be converted to metals or metal oxides (46), and pores which are substantially completely filled with ceramic (12). FIG. 4d shows a cross-sectional schematic representation of a reticulated ceramic product having a solid ceramic component (50) and metals or metal oxides (48) at or near the surfaces of the pores (52) of the reticulated ceramic product.

After the one or more liquid ceramic precursors have been disposed throughout a portion of the porous solid matrix, the one or more liquid ceramic precursors are converted to a gel by treatment with any suitable compound capable of converting the liquid ceramic precursor to a gel, such as for example, water, acid or base. Generally, the conversion is a hydrolysis reaction wherein water effects the conversion; acids or bases may facilitate this conversion. The compounds capable of converting the liquid ceramic precursor to a gel may be liquid, gaseous or both. Preferably, the one or more liquid ceramic precursors are converted to a gel by treatment with water, and most preferably by treatment with one or more dilute aqueous acids or bases. Preferred inorganic acids include hydrochloric acid, nitric acid and sulfuric acid. Suitable organic acids include acetic acid, p-toluenesulfonic acid and trifluoroacetic acid. Preferred inorganic bases include ammonium hydroxide, sodium hydroxide and potassium hydroxide. Suitable organic acids include triethanolamine and tetramethyl ammonium hydroxide. Most preferably, the one or more ceramic precursors are converted to a gel with dilute aqueous ammonium hydroxide. It is preferred that the one or more compounds used to convert the liquid ceramic precursor to a gel are used at a molar excess relative to the liquid ceramic precursor. The conversion is preferably done at a temperature of from about 20° C. to about 150° C., preferably from about 25° C. to about 100° C. for from about 1 hour to about 10 days, preferably for from about 5 hours to about 5 days. The preferred method for treating the liquid ceramic precursor/porous solid matrix is by exposing the liquid ceramic precursor/porous solid matrix to a liquid or gaseous sample of the compound capable of converting the liquid ceramic precursor to a gel for a period of time sufficient to convert the liquid ceramic precursor into a gel. The time and temperature needed to convert the ceramic precursor to a gel will vary in part due to the solubility the one or more dilute aqueous inorganic acids or bases in the porous solid matrix/ceramic precursor, the particle size of the porous solid matrix, the extent to which the liquid ceramic precursor has been disposed throughout the porous solid matrix and on the porosity of the porous solid matrix.

After a gel has been formed from the one or more liquid ceramic precursors disposed throughout a portion of the porous solid matrix, a ceramic is formed from the gel. Preferably the ceramic is formed by heating the gel/matrix composite at a temperature of from about 300° C. to about 2000° C., most preferably at a temperature of from about 500° C. to about 1600° C. for a period of time sufficient to convert the gel to ceramic, generally from about 10 minutes to about 10 hours, preferably from about 1 hour to about 4 hours. It is also preferred that any compounds which might be liberated during the heating be continually removed.

In order that the reticulated ceramic product have pores, it is necessary that at least a portion of the porous solid matrix be removed by any suitable means. Preferably, at least a portion of the porous solid matrix is volatilized and removed during the heating of the gel/matrix composite needed to form the ceramic. However, additional heating, heating at a higher temperature, or heating in the presence of oxygen may be suitable means for removing some or all of the porous solid matrix. Another suitable means of removing a portion of the porous solid matrix may be, for example, by chemical means. Chemical means for removing a portion of the porous solid matrix might be, for example, exposing the ceramic/matrix composite to certain compounds and under certain conditions in which the porous solid matrix is unstable or soluble. Another suitable means for removing some or all of the porous solid matrix might be, for example, exposing the ceramic/matrix composite to radiation at a frequency at which the porous solid matrix is not stable.

The chemical composition of the reticulated ceramic product will depend upon the liquid ceramic precursor used. Preferably, the chemical composition of the reticulated ceramic product will be: an oxide of titanium, tin, lead, zirconium, ruthenium, tungsten, yttrium, nickel, magnesium, calcium, aluminum, silicon or boron; a nitride of titanium, zirconium, aluminum, silicon or boron; a carbide of titanium, zirconium, tungsten, silicon or boron; a boride of titanium, zirconium or tungsten.

The reticulated ceramic products of the present invention are useful as chromatographic media, catalysts, adsorbents and electronic components.

The following examples are set forth to illustrate the present invention, but the scope of the present invention is not intended to be limited thereby.

The materials appearing in Table 1, below, were used as porous solid matrices. Porous Solid Matrix 1, 2 and 4 are macroreticular crosslinked acrylic polymeric adsorbents, and Porous Solid Matrix 3 is a macroreticular crosslinked styrenic anion exchange resin. Each of the porous solid matrices were dried overnight at about 60° C. prior to use. The values reported in Tables 1 and 2 for Total Surface Area, Micropore Volume, Mesopore Volume, Macropore Volume and Total Porosity were measured via nitrogen porosimetry using Micromeritics model 2400 porosimeter.

TABLE 1

| Porous Solid Matrix | Particle Size (mm) | Total Surface Area ($m^2/g$) | Micropore Volume (%) | Mesopore Volume (%) | Macropore Volume (%) | Total Porosity ($cm^3/g$) |
|---|---|---|---|---|---|---|
| 1 | 340 | 411.32 | 0.085 | 86 | 3 | 0..466 |
| 2 | 24.5 | 516.9 | 9 | 81 | 11 | 0.808 |
| 3 | 470 | 42.6 | 1 | 23 | 75 | 0.394 |

TABLE 1-continued

| Porous Solid Matrix | Particle Size (mm) | Total Surface Area ($m^2/g$) | Micropore Volume (%) | Mesopore Volume (%) | Macropore Volume (%) | Total Porosity ($cm^3/g$) |
|---|---|---|---|---|---|---|
| 4 | 920 | 411.32 | 0.085 | 86 | 3 | 0.466 |

EXAMPLE 1

$SiO_2$ from tetraethyl orthosilicate

A 2.00 gram sample of Porous Solid Matrix #1 and 3.64 grams of tetraethylorthosilicate were placed in a sealed jar and allowed to stand overnight. The jar was unsealed and placed in a larger second jar containing 50 milliliters of a 3 percent by weight aqueous ammonium hydroxide solution. The second jar was sealed and maintained at 70° C. for 4 days. The sample was transferred to a crucible and the crucible was placed in a furnace. The internal temperature of the furnace was raised to 775° C. at a rate of 10° C. per minute. The temperature of the furnace was maintained at 775° C. for 4 hours, then allowed to cool to room temperature.

The resulting spherical free-flowing product was 1.02 grams of $SiO_2$. Other data appear in Table 2 below.

EXAMPLE 2

$SiO_2$ from tetraethyl orthosilicate

A 3.00 gram sample of Porous Solid Matrix #2 and 5.64 grams of tetraethylorthosilicate were placed in a sealed jar and allowed to stand overnight. The jar was unsealed and placed in a larger second jar containing 50 milliliters of a 3 percent by weight aqueous ammonium hydroxide solution. The second jar was sealed and maintained at 70° C. for 3 days. The sample was transferred to a crucible and the crucible was placed in a furnace. The internal temperature of the furnace was raised to 775° C. at a rate of 10° C. per minute. The temperature of the furnace was maintained at 775° C. for 4 hours, then allowed to cool to room temperature.

The resulting spherical free-flowing product was 1.56 grams of $SiO_2$. Other data appear in Table 2 below.

EXAMPLE 3

$SiO_2$ from sodium silicate solution

A 1.00 gram sample of Porous Solid Matrix #1 and 2.0 milliliters of a 28.3 percent by weight aqueous $SiO_2$ solution having a $SiO_2/Na_2O$ ratio of 3.17 (available from PQ Corporation as N-Silicate solution ) were placed in a sealed jar and allowed to stand overnight. The jar was unsealed and placed in a larger second jar containing 20 milliliters of 12 molar hydrochloric acid. The second jar was sealed and maintained at 60° C. for 3 days. The contents of the second jar were washed three times with deionized water and the liquid was discarded. The remaining sample was transferred to a crucible and the crucible was placed in a furnace. The internal temperature of the furnace was raised to 775° C. at a rate of 10° C. per minute. The temperature of the furnace was maintained at 775° C. for 4 hours, then allowed to cool to room temperature.

The resulting spherical free-flowing product was 0.75 grams of $SiO_2$. Other data appear in Table 2 below.

EXAMPLE 4

ZrO$_2$ from zirconium tetrapropoxide

A 10.00 gram sample of Porous Solid Matrix #1 was placed in a jar. To this sample was added a 70 percent by weight solution of zirconium tetrapropoxide in 1-propanol until the sample of Porous Solid Matrix #1 was covered with the solution. This mixture was allowed to stand overnight. The solution which remained in the jar was removed by syringe, and then 100 milliliters of deionized water was added to the jar. The jar was sealed and maintained at 60° C. for 2 days. The contents of the jar were vacuum filtered and dried at 70° C. overnight. The dried sample was transferred to a crucible and the crucible was placed in a furnace. The internal temperature of the furnace was raised to 775° C. at a rate of 10° C. per minute. The temperature of the furnace was maintained at 775° C. for 4 hours, then allowed to cool to room temperature.

The resulting spherical free-flowing product was 8.52 grams of ZrO$_2$. Other data appear in Table 2 below.

EXAMPLE 5

ZrO$_2$ using a porous SiO$_2$ template

A 0.50 gram sample of Reticulated Ceramic Product (SiO$_2$) of Example #1 was placed in a jar. To this sample was added a 70 percent by weight solution of zirconium tetrapropoxide in 1-propanol until the sample of SiO$_2$ was covered with the solution. This mixture was allowed to stand overnight. The contents of the jar were filtered. The filtered sample was returned to the jar and the entire jar was placed in a larger second jar containing 50 milliliters of 3 percent by weight aqueous ammonium hydroxide. The second jar was sealed and maintained at 70° C. for 3 days. The contents of the first jar were transferred to a crucible and the crucible was placed in a furnace. The internal temperature of the furnace was raised to 775° C. at a rate of 10° C. per minute. The temperature of the furnace was maintained at 775° C. for 4 hours, then allowed to cool to room temperature. The sample was allowed to cool. The sample was immersed overnight in 50 milliliters of 10 percent by weight aqueous sodium hydroxide to remove the SiO$_2$. The sample was vacuum filtered and washed three times with deionized water.

The resulting spherical free-flowing product was 0.95 grams of ZrO$_2$. Other data appear in Table 2 below.

EXAMPLE 6

Al$_2$O$_3$ from aluminum tri(sec-butoxide)

A 10.00 gram sample of Porous Solid Matrix #1 was placed in a jar. To this sample was added aluminum tri(sec-butoxide) until the sample of Porous Solid Matrix #1 was covered with the aluminum tri(sec-butoxide). This mixture was allowed to stand overnight. The aluminum tri(sec-butoxide) which remained in the jar was removed by syringe, and then 100 milliliters of deionized water was added to the jar. The jar was sealed and maintained at 60° C. for 2 days. The contents of the jar were vacuum filtered and dried at 70° C. overnight. The dried sample was transferred to a crucible and the crucible was placed in a furnace. The internal temperature of the furnace was raised to 775° C. at a rate of 10° C. per minute. The temperature of the furnace was maintained at 775° C. for 4 hours, then allowed to cool to room temperature.

The resulting spherical free-flowing product was 3.53 grams of Al$_2$O$_3$. Other data appear in Table 2 below.

EXAMPLE 7

TiO$_2$ from titanium tetrapropoxide

A 4.00 gram sample of Porous Solid Matrix #1 was placed in a jar. To this sample was added titanium tetraisopropoxide until the sample of Porous Solid Matrix #1 was covered with the titanium tetraisopropoxide. This mixture was allowed to stand overnight. The titanium tetraisopropoxide which remained in the jar was removed by syringe, and then 100 milliliters of deionized water was added to the jar. The jar was sealed and maintained at 60° C. for 2 days. The contents of the jar were vacuum filtered and dried at 70° C. overnight. The dried sample was transferred to a crucible and the crucible was placed in a furnace. The internal temperature of the furnace was raised to 700° C. at a rate of 10° C. per minute. The temperature of the furnace was maintained at 700° C. for 4 hours, then allowed to cool to room temperature.

The resulting spherical free-flowing product was 1.76 grams of TiO$_2$. Other data appear in Table 2 below.

EXAMPLE 8

SnO$_2$ coated with Pt

A 1.00 gram sample of Porous Solid Matrix #3 was suspended in a jar with 10 milliliters of deionized water. A solution of 0.0174 grams of hydrogen hexachloroplatinate in 10 milliliters of deionized water was added dropwise to the jar over 5 minutes. The mixture was stirred for 30 minutes. A solution of 0.04 grams of lithium borohydride in 5 milliliters water was added to the jar and the mixture was stirred overnight. The contents of the jar were filtered and dried overnight at 70° C. A 1.00 gram sample of stannous acetylacetonate was added, the jar was sealed and the mixture was allowed to stand overnight. The jar was opened and excess stannous acetylacetonate was removed by blotting with a cotton swab.

The jar was placed in a larger second jar which containing 20 milliliters of 3 percent by weight aqueous ammonium hydroxide. The second jar was sealed and maintained at 70° C. for 4 days. The contents of the first jar were transferred to a crucible and the crucible was placed in a furnace. The internal temperature of the furnace was raised to 775° C. at a rate of 10° C. per minute. The temperature of the furnace was maintained at 775° C. for 4 hours, then allowed to cool to room temperature.

The resulting spherical free-flowing product was 0.95 grams of porous SnO$_2$ coated with Pt metal. Other data appear in Table 2 below.

EXAMPLE 9

Large diameter Porous SiO$_2$

A 1.21 gram sample of Porous Solid Matrix #4 and 2.55 grams of tetraethylorthosilicate were placed in a sealed jar and allowed to stand overnight. The jar was unsealed and placed in a larger second jar containing 50 milliliters of a 3 percent by weight aqueous ammonium hydroxide solution. The second jar was sealed and maintained at 60° C. for 3 days. The sample was transferred to a crucible and the crucible was placed in a furnace. The internal temperature of the furnace was raised to 775° C. at a rate of 10° C. per minute. The temperature of the furnace was maintained at 775° C. for 4 hours, then allowed to cool to room temperature. The resulting spherical free-flowing product was 0.73 grams of SiO$_2$. Other data appear in Table 2 below.

ratus was heated to 150° C. using a proportional controller to maintain this temperature.

A mixture of 2% carbon monoxide, 21% oxygen and 77% helium was passed through each of the heated

TABLE 2

| Ex. | Mean Particle Size (μm) | Total Surface Area (m$^2$/g) | Average Pore Diameter (Å) | Micropore Volume (%) | Mesopore Volume (%) | Macropore Volume (%) | Total Porosity (cm$^3$/g) |
|---|---|---|---|---|---|---|---|
| 1 | 338 | 190 | 370 | 1 | 41 | 51 | 1.77 |
| 2 | 64 | 209 | 344 | 0 | 36 | 63 | 1.59 |
| 3 | 276 | 37.1 | 443 | 4 | 10 | 86 | 0.31 |
| 4 | 180 | 42 | 221 | 1 | 90 | 9 | 0.26 |
| 5 | 179 | 326 | 59.3 | 28 | 51 | 21 | 0.33 |
| 6 | 255 | 240 | 206 | 0 | 42 | 58 | 1.29 |
| 7 | 199 | 13.0 | 377 | 1 | 41 | 58 | 0.13 |
| 8 | 31 | 28 | 467 | n/a[1] | n/a | n/a | n/a |
| 9 | 718 | 194 | 323 | n/a | n/a | n/a | n/a |

[1] n/a = data not available

EXAMPLE 10

Chromatography on SiO$_2$

To a jar containing 0.84 grams of the reticulated ceramic product of Example 1 (SiO$_2$) was added 10 milliliters of deionized water and 10 milliliters of concentrated nitric acid. The contents of the jar were stirred overnight, filtered, washed once with deionized water, washed twice with 3 percent by weight aqueous ammonium hydroxide and filtered. The sample was then dried at 70° C. overnight. A slurry was formed by mixing a 0.41 gram sample of the dried material and a sufficient quantity of heptane to provide a total volume of 25 milliliters. The slurry was poured into 1 centimeter diameter glass column fitted with adjustable endcaps. The slurry was allowed to settle, and the upper end cap was brought into contact with the reticulated ceramic product of Example 1. The bed-length was 2.0 centimeters. The column was attached to a Rainin HPXL pumping system, and heptane was pumped through the column at a rate of 6 milliliters per minute for 5 minutes followed by a mixture of 99 parts by weight heptane and 1 part by weight isopropanol. A 3 microliter sample of an acetonitrile solution containing 0.5 percent by weight methyl benzoate and 0.5 percent by weight aniline was injected into the heptane/isopropanol solution being pumped through the column. The eluate from the column was monitored with a Rainin UV-1 detector at wavelength 230 nm. The chromatogram displayed two distinct peaks indicating the ability of the column to separate the methyl benzoate and the aniline.

EXAMPLE 11

Catalysis on SnO$_2$ coated with Pt

A glass tube with an inner diameter of 3.75 millimeters and a length of 150 millimeters was plugged at one end with glass wool. A 0.48 gram sample of the platinum-coated reticulated ceramic product (SnO$_2$) of Example 8 was poured into the column, and held in place with another plug of glass wool. The height of the packed bed was 68 millimeters. A second tube of the same dimensions was packed with a similar porous SnO$_2$ which was not coated with platinum. The tubes were covered with aluminum foil, then wrapped in a heating tape. A thermocouple was inserted under the heating tape for temperature monitoring, and the apparatus tubes at a rate of 1.5 millimeters per minute. After 30 minutes, carbon dioxide detection tubes (SKC Inc., catalog #800-23501) were mounted at the exit ends of the heated tubes. Formation of a blue color in the detection tube demonstrated that carbon monoxide had been oxidized to form carbon dioxide within the tube containing the platinum-coated reticulated ceramic product (SnO$_2$) of Example 8. No color was observed in the detection tube monitoring the tube containing uncoated SnO$_2$. The results indicate the catalytic ability of the platinum-coated reticulated ceramic product (SnO$_2$) of Example 8 to oxidize carbon monoxide.

I claim:

1. A reticulated ceramic product comprising a porous ceramic particle having a total pore volume, wherein the total pore volume comprises
   (a) mesopore volume at a level of from about 5 to about 95 percent of the total pore volume, and
   (b) optionally, macropore volume at a level of from 0 to about 95 percent of the total pore volume, and
   (c) optionally, micropore volume at a level of from 0 to about 60 percent of the total pore volume
   wherein the sum of the mesopore volume, the micropore volume and the macropore volume is 100 percent of the total pore volume.

2. The reticulated ceramic product of claim 1, wherein the mesopore volume is from about 10 to about 90 percent of the total pore volume.

3. The reticulated ceramic product of claim 1, wherein the mesopore volume is from about 20 to about 85 percent of the total pore volume.

4. The reticulated ceramic product of claim 1, wherein the ceramic product is an oxide of a metal selected from the group consisting of titanium, tin, lead, zirconium, ruthenium, tungsten, yttrium, nickel, magnesium, calcium, aluminum, silicon and boron.

5. The reticulated ceramic product of claim 1, wherein the ceramic product is selected from the group consisting of silicon oxide, aluminum oxide, zirconium oxide and ruthenium oxide.

6. The reticulated ceramic product of claim 1, wherein the ceramic product is a nitride of a metal selected from the group consisting of titanium, zirconium, aluminum, silicon and boron.

7. The reticulated ceramic product of claim 1, wherein the ceramic product is a carbide of a metal selected from the group consisting of titanium, zirconium, tungsten, silicon and boron.

8. The reticulated ceramic product of claim 1, wherein the ceramic product is a boride of a metal selected from the group consisting of titanium, zirconium and tungsten.

9. A method of making reticulated ceramic products comprising:
disposing one or more liquid ceramic precursors throughout a portion of a porous solid matrix selected from the group consisting of porous $SiO_2$, zeolites and porous polymer particles, forming a gel from the one or more liquid ceramic precursors disposed throughout said portion of the porous solid matrix, forming a ceramic from the gel, and removing a portion of said porous solid matrix.

10. The method of claim 9, wherein the liquid ceramic precursor is selected from the group consisting of alkoxides, halides, carbonates, sulfates and carboxylates of one or more metals selected from the group consisting of titanium, tin, lead, zirconium, ruthenium, tungsten, yttrium, nickel, magnesium, calcium, aluminum, silicon and boron.

11. The method of claim 9, wherein the liquid ceramic precursor is selected from the group consisting of acetoacetonates, carbonyls, nitrosyls, and cyclopentadienyls of one or more metals selected from the group consisting of titanium, tin, lead, zirconium, nickel, magnesium, calcium, aluminum, silicon and boron.

12. The method of claim 9, wherein the liquid ceramic precursor is selected from the group consisting of tetraethyl orthosilicate, sodium silicate, zirconium tetrapropoxide, aluminum tri(sec-butoxide), ruthenium III 2,4-pentanedionate, and titanium tetrapropoxide.

13. The method of claim 9, wherein the porous solid matrix is a porous solid inorganic matrix selected from the group consisting of porous $SiO_2$ and zeolites.

14. The method of claim 9, wherein the porous solid matrix is a porous polymer selected from the group consisting of porous ion-exchange resins and adsorbents.

15. The method of claim 9, wherein the porous solid matrix contains one or more compounds selected from the group consisting of metals and metal oxides.

16. The method of claim 9, wherein the porous solid matrix contains one or more compounds which can be converted to metals or metal oxides.

* * * * *